US009878357B2

(12) United States Patent
Lee et al.

(10) Patent No.: US 9,878,357 B2
(45) Date of Patent: Jan. 30, 2018

(54) FLEXIBLE ROLL FORMING DEVICE, BLANK GUIDE DEVICE, BLANK FEEDING DEVICE, AND FLEXIBLE ROLL FORMING SYSTEM HAVING THE SAME

(71) Applicant: SUNGWOO HITECH CO., LTD., Busan (KR)

(72) Inventors: Mun Yong Lee, Busan (KR); Jin Ho Jung, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 323 days.

(21) Appl. No.: 14/139,980

(22) Filed: Dec. 24, 2013

(65) Prior Publication Data
US 2015/0027192 A1  Jan. 29, 2015

(30) Foreign Application Priority Data

Jul. 25, 2013  (KR) .................. 10-2013-0088295
Jul. 25, 2013  (KR) .................. 10-2013-0088297
(Continued)

(51) Int. Cl.
*B21B 31/20*  (2006.01)
*B21B 1/22*  (2006.01)
(Continued)

(52) U.S. Cl.
CPC ............... *B21B 31/20* (2013.01); *B21B 1/22* (2013.01); *B21B 35/00* (2013.01); *B21B 39/14* (2013.01);
(Continued)

(58) Field of Classification Search
CPC ............ B21B 1/22; B21B 31/16; B21B 31/20; B21B 39/00; B21B 39/004; B21B 39/14;
(Continued)

(56) References Cited

U.S. PATENT DOCUMENTS 1,398,188 A * 11/1921 Hazlewood ............. B21B 39/04
72/250
3,269,627 A *  8/1966 O'Brien ................. B21B 39/14
226/179
(Continued)

FOREIGN PATENT DOCUMENTS

DE         19612239      10/1997
EP         1537922 A1 *  6/2005 ............. B21D 5/083
(Continued)

*Primary Examiner* — Teresa M Ekiert
*Assistant Examiner* — Gregory Swiatocha
(74) *Attorney, Agent, or Firm* — Lex IP Meister, PLLC

(57) ABSTRACT

Disclosed is a flexible roll forming device including: bases respectively disposed on opposite sides with respect to a process direction center line in a left/right direction, each having an opening formed in an upper side thereof connected to an inside thereof, and rails configured thereon on opposite sides of the opening in a lateral direction of the process; forward/backward moving cyclinder having a slide plate provided to be movable along the rails on the base; turning reducer rotatably provided to the slide plate; and upper and lower forming rolls provided on the turning cylinder for subjecting a material fed thereto to flexible roll forming by using the upper and lower forming rolls while varying positions in the lateral direction of processing with the forward/backward moving cylinder, and angles from a process direction with the turning reducer.

6 Claims, 16 Drawing Sheets

(30) Foreign Application Priority Data

Jul. 25, 2013 (KR) .................. 10-2013-0088302
Jul. 25, 2013 (KR) .................. 10-2013-0088305

(51) Int. Cl.

| | | |
|---|---|---|
| B21B 35/00 | (2006.01) | |
| B21B 39/14 | (2006.01) | |
| B21D 5/08 | (2006.01) | |
| B21D 5/12 | (2006.01) | |
| B21D 43/00 | (2006.01) | |
| B21D 43/05 | (2006.01) | |
| B65G 21/20 | (2006.01) | |

(52) U.S. Cl.

CPC ............... *B21D 5/08* (2013.01); *B21D 5/083* (2013.01); *B21D 5/12* (2013.01); *B21D 43/003* (2013.01); *B21D 43/006* (2013.01); *B21D 43/055* (2013.01); *B65G 21/2072* (2013.01)

(58) Field of Classification Search

CPC ......... B21B 39/06; B21B 39/10; B21B 39/12; B21B 39/16; B21B 39/34; B21B 39/02; B21B 39/04; B21B 39/08; B21D 5/06; B21D 5/083; B21D 5/08; B21D 5/12; B21D 43/003; B21D 43/006; B21D 43/02; B21D 43/04; B21D 43/10; B21D 43/05; B21D 43/055; B21D 43/057; B21D 43/105; B21D 43/11; B21D 43/13; B65G 13/02; B65G 13/06; B65G 13/071; B65G 13/11; B65G 13/12

USPC ......... 72/176, 179, 181, 182, 250, 251, 420, 72/421, 422, 423, 424, 425, 426, 427, 72/428

See application file for complete search history.

(56) References Cited

U.S. PATENT DOCUMENTS

| | | | | |
|---|---|---|---|---|
| 3,604,696 | A * | 9/1971 | Coleman | C21D 1/667 266/102 |
| 3,628,361 | A * | 12/1971 | De Rupa | B21D 5/08 72/181 |
| 5,706,691 | A | 1/1998 | Okamoto | |
| 5,722,278 | A | 3/1998 | Horino | |
| 6,289,708 | B1 * | 9/2001 | Keinanen | B21D 5/08 72/178 |
| 6,993,953 | B2 * | 2/2006 | Stupecky | B21D 37/10 29/283.5 |
| 8,234,899 | B1 * | 8/2012 | Chuang | B21D 5/08 72/179 |
| 8,601,845 | B2 | 12/2013 | Ingvarsson | |
| 9,174,258 | B2 | 11/2015 | Freitag | |
| 2004/0244454 | A1 | 12/2004 | McDonald | |
| 2007/0137505 | A1 * | 6/2007 | Heid | B21D 43/05 100/144 |
| 2007/0180880 | A1 * | 8/2007 | Lyons | B21D 7/028 72/168 |
| 2008/0216541 | A1 | 9/2008 | Fudulu | |
| 2010/0083722 | A1 * | 4/2010 | Bachthaler | B21D 5/083 72/237 |
| 2010/0139350 | A1 * | 6/2010 | Smith | B21D 5/08 72/11.2 |
| 2011/0003113 | A1 | 1/2011 | Lengauer | |
| 2011/0179842 | A1 | 7/2011 | Freitag | |
| 2013/0276497 | A1 * | 10/2013 | Ingyarsson | B21D 5/08 72/12.8 |

FOREIGN PATENT DOCUMENTS

| | | |
|---|---|---|
| JP | 59-027723 | 2/1984 |
| JP | 07-016696 | 3/1995 |
| JP | 08-309439 | 11/1996 |
| JP | 09-010839 | 1/1997 |
| KR | 10-2002-0033239 | 5/2002 |
| KR | 10-2002-0048156 | 6/2002 |
| KR | 10-0683243 | 2/2007 |
| KR | 10-0775232 | 11/2007 |

* cited by examiner

FLEXIBLE ROLL FORMING DEVICE, BLANK GUIDE DEVICE, BLANK FEEDING DEVICE, AND FLEXIBLE ROLL FORMING SYSTEM HAVING THE SAME

CROSS-REFERENCE TO RELATED APPLICATION

This application claims priority to and the benefit of Korean Patent Application Nos. 10-2013-0088295, 10-2013-0088297, 10-2013-0088302, and 10-2013-0088305 filed in the Korean Intellectual Property Office on Jul. 25, 2013, the entire contents of which are incorporated herein by reference.

BACKGROUND OF THE INVENTION (a) Field of the Invention

The present invention relates to a flexible roll forming system. More particularly, the present invention relates to a flexible roll forming device for subjecting a blank material to roll forming of a formed beam having different widths and heights along a length direction, a material guide device, a material feeding device, and a flexible roll forming system having the same.

(b) Description of the Related Art

In general, roll forming is a method including uncoiling a material coil and passing it through multi-stages of roll forming units each having one pair of an upper roll and a lower roll disposed on a line for forming a predetermined shape by successive bending. Further, the roll forming method is applicable to fabrication of straight-type formed products formed by bending into predetermined shapes, such as vehicle bumper beams or other members of a certain shape.

FIG. 1 illustrates a schematic view of a related art roll forming system with process steps thereof shown therein.

Referring to FIG. 1, in the related art roll forming method, an uncoiler 1, provided at a start of a process line for uncoiling a coil 10 supplied thereto, processes an uncoiling step S1 of feeding the coil.

A straightener 2 is provided next in a process direction after the uncoiler 1, to process a straightening step S2 for straightening the uncoiled coil 10 from the uncoiler 1 to be flat.

A press 3 is provided next in the process direction after the straightener 2, to process a piercing step S3 for forming holes for various purposes in the coil 10 fed from the straightener 2.

Roll forming units RU1-RU10 of about 10 stages are disposed next in the process direction of the press 3, to process a roll forming step S4 for successively bending the coil 10 being fed thereto through the uncoiler 1, the straightener 2, and the press 3 for roll forming a predetermined straight type of formed beam 20.

A cutting press 4 is provided next in the process direction after the roll forming units, to process a cutting step S5 for cutting the formed beam 20 to produce a formed product 30.

However, in view of the nature of the roll forming with the related art roll forming units, it has a drawback in that only formation of beams having a fixed cross-section along the length direction of the beams is possible, and formation of beams having different widths and heights along the length direction thereof is not possible.

Consequently, since formation of products of different modified cross-sections having different widths and heights along the length direction cannot be formed with the roll forming method, the products have been formed by applying multi-stage forming with a non-continuous process and long cycle time.

The above information disclosed in this Background section is only for enhancement of understanding of the background of the invention and therefore it may contain information that does not form the prior art that is already known in this country to a person of ordinary skill in the art.

SUMMARY OF THE INVENTION

An object of the present invention is to provide a flexible roll forming device for subjecting a blank material to roll forming of a formed beam having different widths and heights along a length direction, a material guide device, a material feeding device and a flexible roll forming system having the same.

In an exemplary embodiment of the present invention, a flexible roll forming device may include: bases respectively disposed on opposite sides with respect to a process direction center line in a left/right direction, each having an opening formed in an upper side thereof connected to an inside thereof, and rails configured thereon on opposite sides of the opening in a lateral direction of the process; forward/backward moving means having a slide plate provided to be movable along the rails on the base; turning means rotatably provided to the slide plate; and roll forming means provided on the turning means to include upper and lower forming rolls for subjecting a material fed thereto to flexible roll forming by using the upper and lower forming rolls while varying positions in the lateral direction of processing with the forward/backward moving means, and angles from a process direction with the turning means.

The forward/backward moving means may further include a forward/backward moving cylinder mounted on the base connected to the slide plate with an operation rod.

The turning means may include a turning reducer mounted to a center of the slide plate, a turning motor mounted under the turning reducer for supplying a torque, and a turntable mounted over the turning reducer so as to be turned by the torque from the turning motor.

The flexible roll forming device may further include a plurality of sensors mounted on the slide plate, Deleted-Textsfor sensing a sensing dog mounted on one side of an underside of the turntable to sense a home position of the turntable with respect to the slide plate, and rotation limit positions in one direction and the other direction and forwarding a signal thereof.

The roll forming means may include upper and lower plates, roll posts coupled to the upper and lower plates mounted to the turning means, upper and lower roll housings mounted to the roll posts to be movable in up/down directions, and upper and lower roll motors mounted to outsides of the upper and lower roll housings connected to the upper and lower forming rolls passed through the roll housings, respectively.

The flexible roll forming device may further include adjusting bolts provided between the upper and lower plates and the upper and lower housings for adjusting and securing positions of the upper and lower roll housings, respectively.

In an exemplary embodiment of the present invention, a material guide device may include: a base plate having a plurality of guide posts mounted thereto; a lower roller unit including a lower slide plate coupled to the guide posts to be movable in up/down directions, a lower roller housing mounted to the lower slide plate, and a plurality of lower rollers mounted to the lower roller housing; an upper roller unit including an upper slide plate mounted to respective guide posts, an upper roller housing mounted under the upper slide plate, and a plurality of upper rollers mounted to the upper roller housing; a drive motor mounted to one side of the lower slide plate such that a rotation shaft of the drive motor is connected to one of lower roller shafts of one of the plurality of lower rollers for forwarding rotation force thereto; and pressure applying means provided on the upper plate for applying a pressure to a material passing through between respective lower rollers and upper rollers.

The lower roller unit may further include a plurality of drive gears mounted to opposite end portions of lower roller shafts provided inside of opposite side walls of the lower roller housing, respectively, a plurality of lower idle gears rotatably mounted to the inside of opposite side walls of the lower roller housing each engaged with the drive gears between adjacent drive gears, and a guider secured to the lower roller housing matched to opposite sides of each of the plurality of lower rollers for guiding the material.

The lower roller unit may further include a plurality of sensors mounted on the guiders matched between the lower rollers with a plurality of sensor brackets for sensing the material fed thereto.

The lower roller unit may further include a height adjusting nut provided on the base plate at a center thereof, and height adjusting means fastened to the height adjusting nut secured to an underside of the lower roller housing for adjusting height of the lower roller housing according to adjustment of the height adjusting nut.

The upper roller unit may include a plurality of driven gears mounted to opposite end portions of the upper roller shafts provided to insides of opposite side walls of the upper roller housing respectively, a plurality of upper idle gears rotatably mounted to the insides of the opposite side walls of the upper roller housing engaged with the driven gears between adjacent driven gears, respectively, and encoders respectively mounted in front and rear of the upper roller housing with encoder brackets each for measuring a feeding speed of the material in a rolling contact state to the material being fed thereto.

The pressure applying means may include an upper plate fixedly secured to top sides of the guide posts, and a pressure applying cylinder mounted to the upper plate with an operation rod thereof connected to the upper slide plate passed through the upper plate.

In an exemplary embodiment of the present invention, a material feeding device may include: a conveyor frame having a plurality of conveyor rollers, and guide rails mounted along opposite sides thereof, respectively; and a centering slider unit including a sliding plate to be slidably movable in a process direction along the guide rails, centering rails mounted on the sliding plate in slanted positions, respectively, and centering sliders provided to be movable along the centering rails for fixedly holding opposite tips of sides of the blank material fed thereto.

The sliding plate may be mounted to the guide rails with slide blocks to be slidably movable in a process direction, and may have sliding hollows on opposite sides thereof to have a distance therebetween which becomes larger as the sliding hollows go farther in the process direction. The centering rails may be mounted on the sliding plate on inner and outer sides of each of the opposite sliding hollows, respectively. The centering slide unit may further include a lateral direction rail disposed on an upper side of a front side of the sliding plate in the lateral direction, lateral direction sliders disposed on opposite sides of the lateral direction rail for slidably moving along the lateral direction rail, and restoring springs connected to one side of the sliding plate and to upper sides of the lateral direction sliders for providing restoring elastic force, respectively. The centering sliders may be respectively disposed on an underside of opposite hollows in the sliding plate connected to the lateral direction sliders through the opposite sliding hollows.

The centering sliders may be connected to the lateral direction sliders with connection blocks slide-movably disposed in the opposite sliding hollows in the sliding plate, respectively.

A largest distance between the sliding hollows formed on opposite sides of the sliding plate may be formed larger than a largest width of the blank material by a predetermined value.

The material feeding device may further include an entrance stopper configured in a shape of a block on a center of a front of the conveyor frame for limiting slide movement of the centering slider unit.

In an exemplary embodiment of the present invention, a flexible roll forming system may include:

a flexible roll forming device including bases respectively disposed on opposite sides with respect to a process direction center line in a left/right direction, each having an opening formed in an upper side thereof connected to an inside thereof, and rails configured thereon on opposite sides of the opening in a lateral direction of the process, forward/backward moving means having a slide plate provided to be movable along the rails on the base, turning means rotatably provided to the slide plate, and roll forming means provided on the turning means to include upper and lower forming rolls for subjecting a material fed thereto to flexible roll forming by using the upper and lower forming rolls while varying positions in the lateral direction of processing with the forward/backward moving means, and angles from a process direction with the turning means;

a material guide device including a base plate having a plurality of guide posts mounted thereto, a lower roller unit including a lower slide plate coupled to the guide posts to be movable in up/down directions, a lower roller housing mounted to the lower slide plate, and a plurality of lower rollers mounted to the lower roller housing, an upper roller unit including an upper slide plate mounted to respective guide posts, an upper roller housing mounted under the upper slide plate, and a plurality of upper rollers mounted to the upper roller housing, a drive motor mounted to one side of the lower slide plate such that a rotation shaft of the drive motor is connected to one of lower roller shafts of one of the plurality of lower rollers for forwarding rotation force thereto, and pressure applying means provided on the upper plate for applying a pressure to a material passing through between respective lower rollers and upper rollers; and a material feeding device including a conveyor frame having a plurality of conveyor rollers and guide rails mounted along opposite sides thereof, respectively, and a centering slider unit including a sliding plate to be slidably movable in the process direction along the guide rails, centering rails mounted on the sliding plate in slanted positions, respectively, and centering sliders provided to be movable along the centering rails for holding opposite tips of sides of the blank material fed thereto.

In an exemplary embodiment of the present invention, a flexible roll forming system may include a plurality of flexible roll forming devices, wherein a plurality of the material guide devices may be provided among the flexible roll forming devices, and the material feeding device may be provided in front of the material guide device provided to a frontmost process.

An exemplary embodiment of the present invention can allow roll forming of a 3D formed beam having a modified cross-section with different widths and heights along a length direction of a blank having a straight portion, an expanded portion, and so on by configuring a multi-stage roll forming device for varying axis direction positions and angles of the upper and lower forming rolls.

Eventually, vehicle body members, frames, and beams having cross-sectional profiles of which widths and heights are different from one another along the length direction can be roll formed as one unit with one roll forming event, permitting minimization of following steps, such as welding, jointing, and the like, contributing to manufacture of lighter cars.

<Description of Symbols>

Figure 1:
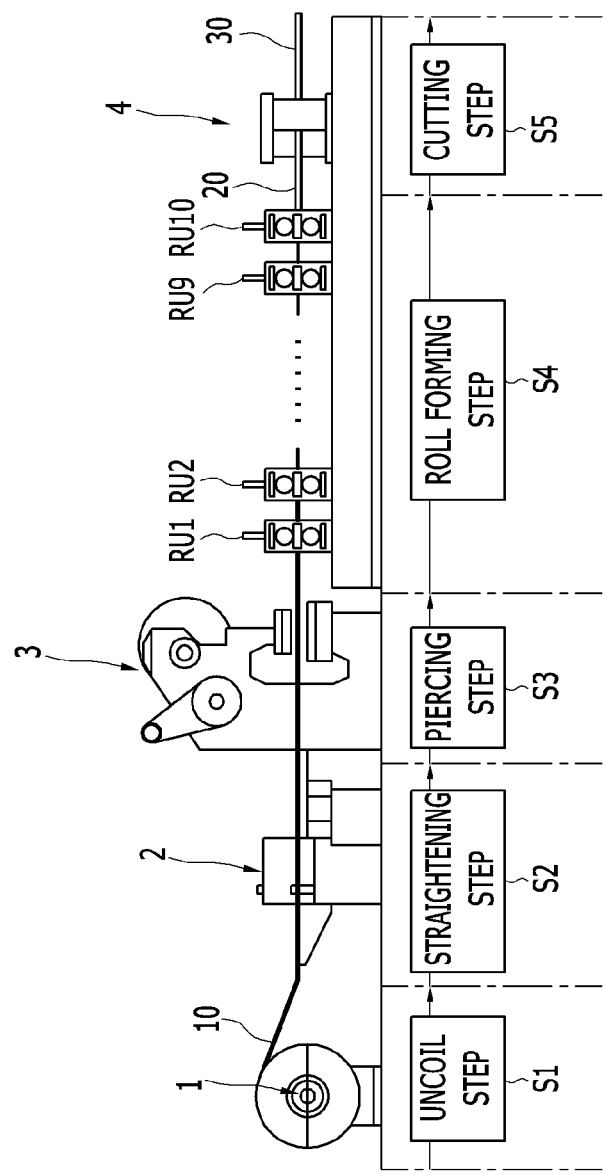
FIG. 1 illustrates a schematic view of a related art roll forming system, with steps thereof shown thereon.

| | |
|---|---|
| 100: flexible roll forming device | 110: forward/backward moving means |
| 103: base | 120: turning means |
| 130: roll forming means | RH1, RH2: upper and lower roll housings |
| 105: space portion | R1, R2: upper and lower forming rolls |
| 105a: opening | |
| 107: rail | RM1, RM2: upper and lower forming roll motors |
| 111: slide plate | |
| 112: slider | B: blank |
| 113: forward/backward moving cylinder | 200: material guide device |
| 114: operating rod | 210: base plate |
| 121: turntable | 211: guide post |
| 122: turning motor | 212: height adjusting means |
| 123: turning reducer | 213: height adjusting nut |
| 124: reducer shaft | 214: height adjusting shaft |
| 125: sensor | 220: lower roller unit |
| 126: sensing dog | 221: lower slide plate |
| 131: roll post | 222: lower roller housing |
| 132: adjusting bolt | 223: lower roller shaft |
| 133, 134: upper and lower plates | 224: guider |
| | 225: sensor bracket |
| 135, 136: upper and lower reducers | 226: sensor |
| | 230: upper roller unit |
| 137: roll shaft | 231: upper slide plate |
| 138: blanking plate | 232: upper roller housing |
| 139: fixing nut | 233: upper roller shaft |
| 234: encoder bracket | 300: material feeding device |
| 235: encoder | 310: conveyor frame |
| 236: encoder roller | 311: guide rail |
| 240: drive motor | 312: slide block |
| 241: motor bracket | 320: conveyor roller |
| 242: reducer | 330: centering slider unit |
| 250: pressure applying means | 331: sliding plate |
| | 332: centering rail |
| 251: upper plate | 334: lateral direction rail |
| G1: drive gear | 335: lateral direction slider |
| G2: driven gear | 333: centering slider |
| GR1: lower roller | 336: restoring spring |
| GR2: upper roller | 337: connection block |
| IG1: lower idle gear | H: sliding hollow |
| IG2: upper idle gear | P: spring pin |

DETAILED DESCRIPTION OF THE EMBODIMENTS

Hereinafter, an exemplary embodiment of the present invention will be described with reference to the accompanying drawings.

A thickness or a size of an element shown in a drawing can be exaggerated, omitted, or shown schematically for convenience or clarity of description.

Parts not relevant to the description are omitted for clarity of the description of an exemplary embodiment of the present invention, and the same or similar elements will be given identical reference numerals throughout the specification.

Figure 2:
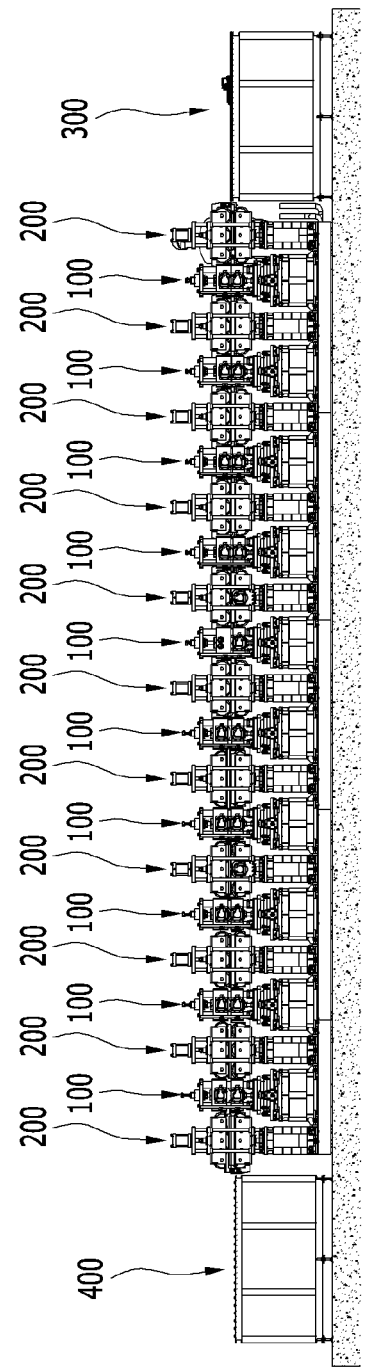
FIG. 2 illustrates a schematic view of a flexible roll forming system showing a concept of steps in accordance with an exemplary embodiment of the present invention.

FIG. 2 illustrates a schematic view of a flexible roll forming system showing a concept of steps in accordance with an exemplary embodiment of the present invention.

Referring to FIG. 2, basically, the flexible roll forming system in accordance with an exemplary embodiment of the present invention uses a blank or a piece as a material (hereinafter, blank) thereof rather than a coil material.

Hereinafter, a process direction is a path in which the blank is processed.

Like the related art, the flexible roll forming system uses a concept in which at least three stages of roll former units each having an upper forming roll and a lower forming roll bend a material fed thereto in succession for roll forming of a formed beam of a predetermined shape.

However, instead of the related art roll forming unit, a flexible roll forming device 100 is applied to the flexible roll forming system in accordance with an exemplary embodiment of the present invention. The flexible roll forming device 100 is configured to have upper forming rolls R1 and lower forming rolls R2 (see FIG. 3) provided in pairs at opposite sides of the process direction to vary an axis direction position and a process direction angle of each side upper forming roll R1 and lower forming roll R2 by driving a cylinder and a motor thereof.

Material guide devices 200 are provided to a front side and a rear side of the process direction of the flexible roll forming device 100, for guiding a material fed to/discharged from the flexible roll forming device 100, respectively.

A material feeding device 300 for feeding the blank to the material guide device 200 at a fixed entering angle and a fixed width direction position is provided to a front side of the first stage flexible roll forming device 100 in the process direction, or precisely, in front of the material guide device 200 disposed in front of the first stage flexible roll forming device 100.

A take-out conveyor 400 is provided at the rear of the final flexible roll forming device 100 in the process direction, or precisely, at the rear of the final material guide device 200 disposed at the rear of the final flexible roll forming device 100.

Figure 3:
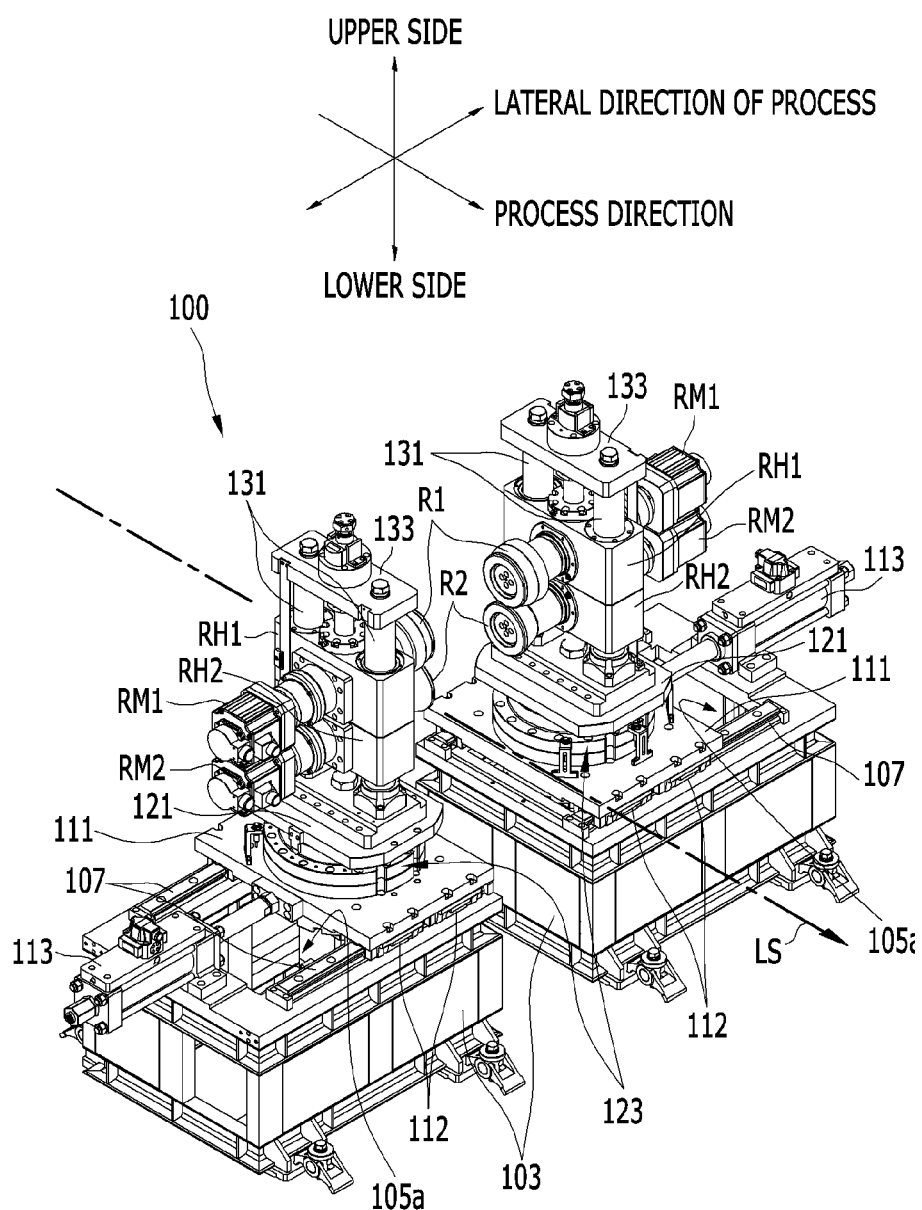
FIG. 3 illustrates a perspective view of a flexible roll forming device applicable to a flexible roll forming system in accordance with an exemplary embodiment of the present invention.
Figure 4:
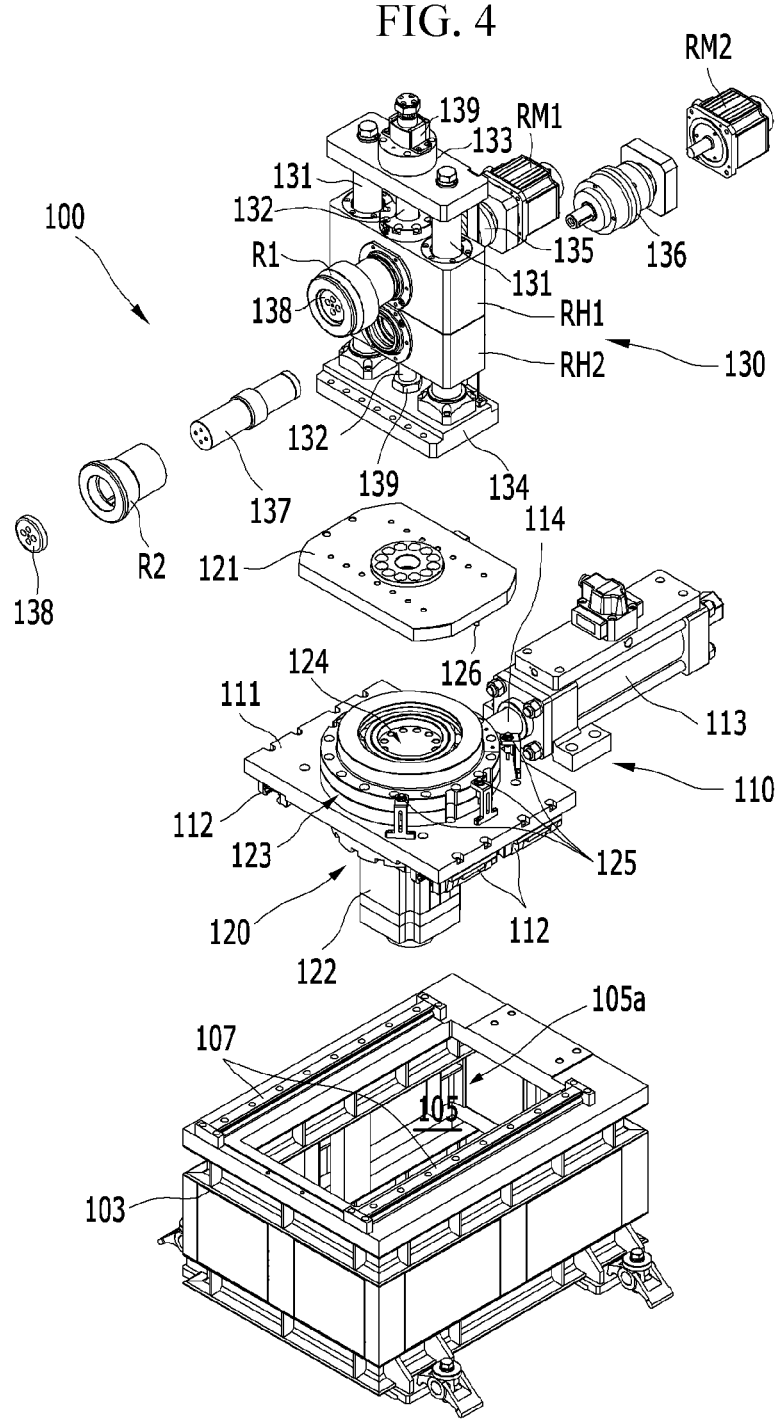
FIG. 4 illustrates a partial exploded perspective view of a flexible roll forming device applicable to a flexible roll forming system in accordance with an exemplary embodiment of the present invention.

FIG. 3 illustrates a perspective view of a flexible roll forming device applicable to a flexible roll forming system in accordance with an exemplary embodiment of the present invention, and FIG. 4 illustrates a partial exploded perspective view of a flexible roll forming device applicable to a flexible roll forming system in accordance with an exemplary embodiment of the present invention.

Referring to FIGS. 3 and 4, the flexible roll forming device 100 in accordance with an exemplary embodiment of the present invention includes bases 103 symmetrically disposed on opposite sides of a center line LS of the process direction, respectively, each with forward/backward moving means 110, turning means 120, and roll forming means 130 mounted thereon.

Each of the bases 103 has a space portion 105 formed therein, and an opening 105*a* formed in an upper side thereof connected to the space portion 105.

The base 103 has rails 107 mounted on an upper side of both sides of the opening 105*a* in a lateral direction of the process.

The forward/backward moving means 110 includes a slide plate 111 movably provided along the rails 107 on the base 103.

The slide plate 111 is mounted on the rails 107 on the base 103 through a slider 112 to be movable in the lateral direction of the process.

A forward/backward moving cylinder 113 connected to the slide plate 111 with an operation rod 114 is mounted to one side of the base 103. If the forward/backward moving cylinder 113 moves forward or backward, the slide plate 111 moves in the lateral direction of the process.

The turning means 120 includes a turning reducer 123 mounted to a center of the slide plate 111, and a turning motor 122 mounted under the slide plate 111 connected to the turning reducer 123.

In this case, the turning motor 122 may be a servo motor which is reversible, and of which RPM and number of rotations are controllable.

The turning reducer 123 has a reducer shaft 124 having a turntable 121 mounted thereto for rotating the turntable 121 with a torque of the turning motor 122 transmitted through the turning reducer 123 at a reduced speed.

The turning motor 122 is disposed in the space portion 105 through the opening 105*a* in the base 103 for moving without interference with the base 103 when the slide plate 111 slidably moves in the lateral direction of the process of the base 103.

A sensing dog 126 is mounted on an underside of the turntable 121, and a plurality of sensors 125 for sensing the sensing dog 126 are mounted on the slide plate 111 at the turntable 121 to sense a home position and states of rotation limit positions of the turntable 121 in each direction with respect to the slide plate 111, and to forward a signal thereof to a controller (not shown).

In this case, although the sensor 125 may be a proximity sensor for sensing the sensing dog 126 when the sensing dog 126 comes within a predetermined range, the sensor 125 is not limited to this, and other sensing means such as a limit switch are applicable as long as the sensing means can sense a rotated position of the turntable 121 on the slide plate 111.

The roll forming means 130 is mounted on the turntable 121 and includes a plurality of roll posts 131, upper and lower roll housings RH1 and RH2, upper and lower roll motors RM1 and RM2, upper and lower forming rolls R1 and R2, and adjusting bolts 132.

The roll posts 131 are coupled to upper and lower plates 133 and 134 with bolts, and fixedly secured to the turntable 121 through the lower plate 134.

The upper and lower roll housings RH1 and RH2 are mounted to both sides of the roll posts 131 to be movable in up/down directions.

Upper and lower reducers 135 and 136 are mounted to one side of the upper and lower roll housings RH1 and RH2, respectively, and upper and lower roll motors RM1 and RM2 connected to the upper and lower reducers 135 and 136, respectively.

Roll shafts 137 are rotatably mounted to the upper and lower roll housings RH1 and RH2, respectively, the roll shafts 137 are respectively connected to the upper and lower reducers 135 and 136, and the upper and lower forming rolls R1 and R2 are respectively mounted to the roll shafts 137.

That is, the upper and lower forming rolls R1 and R2 are respectively coupled to the roll shafts 137 while being secured with keys, and blanking plates 138 are fastened to fore ends of the roll shafts 137 for preventing the upper and lower forming rolls from falling off, respectively.

In this case, the upper and lower roll motors RM1 and RM2 may be servo motors which are reversible and of which RPM and number of rotations are controllable.

The adjusting bolts 132 are provided between the upper plate 133 and the upper roll housing RH1 and between the lower plate 134 and the lower housing RH2 for adjusting and securing positions of the upper and lower roll housings RH1 and RH2, respectively.

Each of the adjusting bolts 132 has a fixing nut 139 fastened thereto for fixing the upper and lower roll housings RH1 and RH2 in the adjusted positions, respectively.

Figure 5:
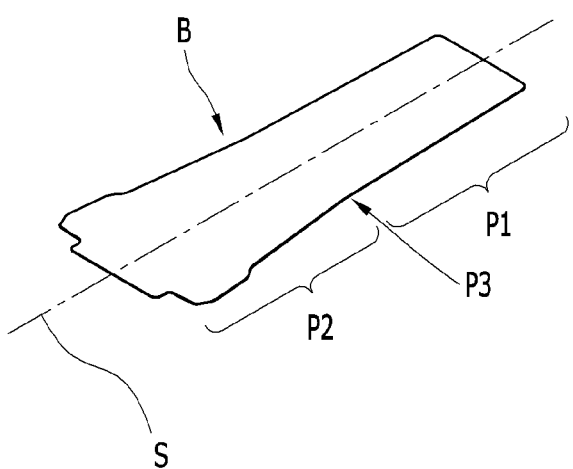
FIG. 5 illustrates a perspective view of an example of a material to be fed to a flexible roll forming device in accordance with an exemplary embodiment of the present invention.

FIG. 5 illustrates a perspective view of an example of a material to be fed to a flexible roll forming device 100 in accordance with an exemplary embodiment of the present invention.

Referring to FIG. 5, basically, the material used in the flexible roll forming device 100 in accordance with an exemplary embodiment of the present invention is a blank material B of a predetermined standard. It is favorable for the blank to be symmetric in a left/right direction with respect to a length direction center line S taking formability into account.

That is, although forming is difficult if the blank material B has a large variation of a width along a length direction, the blank material B may have a width that varies along the length direction on the whole, and may include a straight portion P1 having a fixed width along the length direction, an expanded portion P2 having a width which becomes larger farther in the length direction, and a curve portion P3 connecting the straight portion P1 to the expanded portion P2 with a curved line.

The operation of the flexible roll forming device 100 in accordance with an exemplary embodiment of the present invention will be described with reference to FIGS. 6 and 7.

Figure 6:
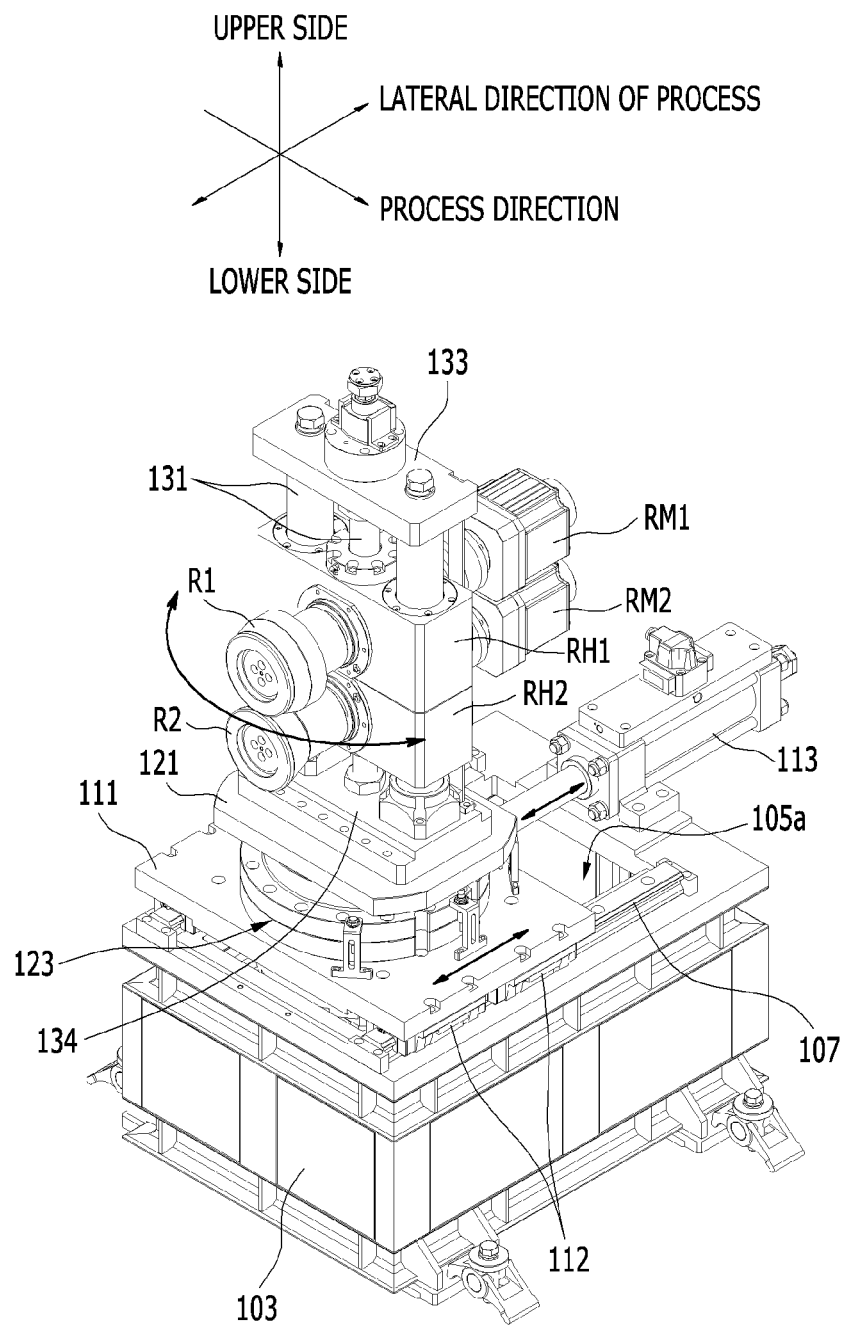
FIG. 6 illustrates a perspective view of a flexible roll forming device in accordance with an exemplary embodiment of the present invention, showing operation thereof.
Figure 7:
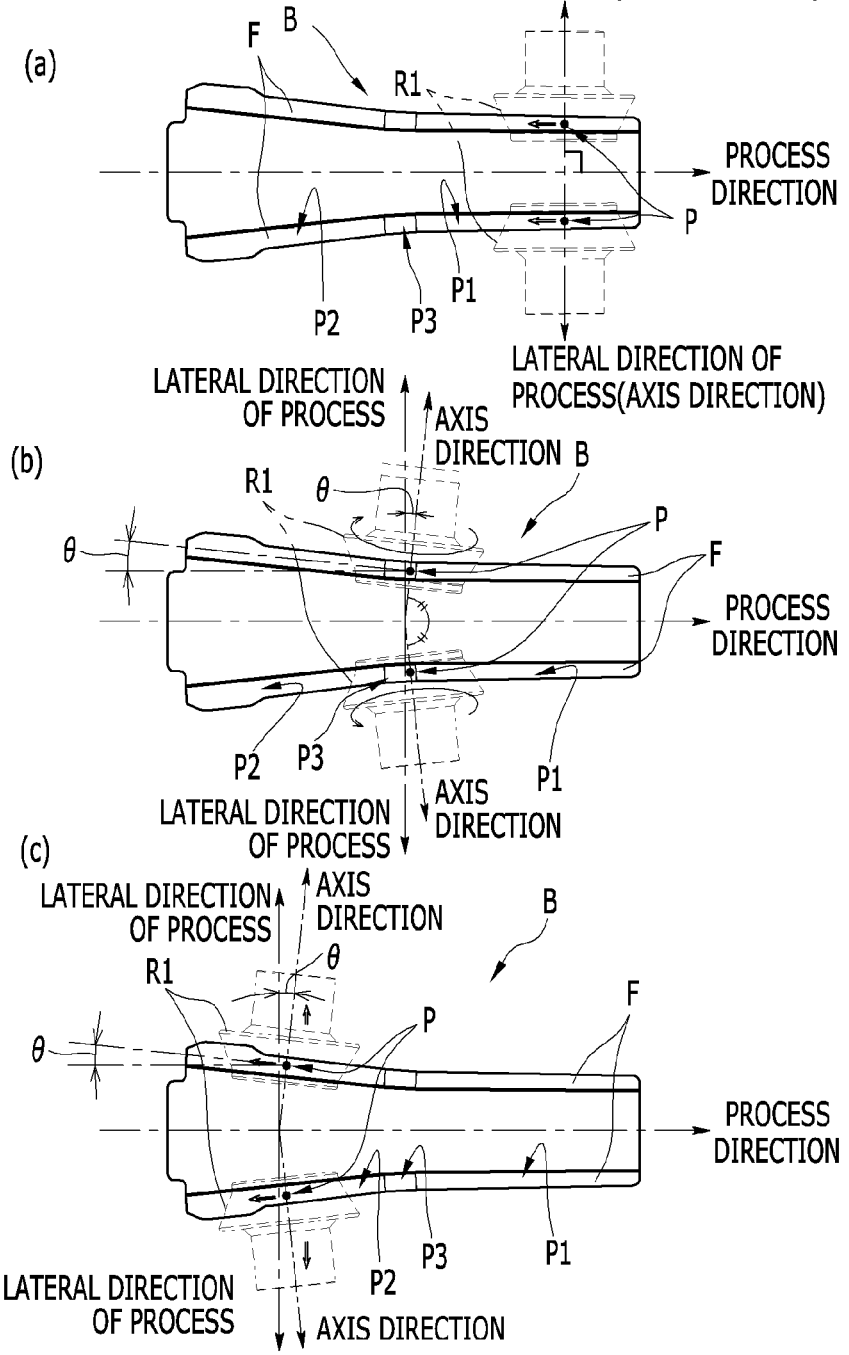
FIG. 7 (a) to (c) illustrate operational schematic views of a flexible roll forming device in accordance with an exemplary embodiment of the present invention.

FIG. 6 illustrates a perspective view of a flexible roll forming device in accordance with an exemplary embodiment of the present invention, showing operation thereof, and FIG. 7 (a) to (c) illustrate operational schematic views of a flexible roll forming device in accordance with an exemplary embodiment of the present invention.

Referring to FIG. 6, the flexible roll forming device 100 may control the lateral direction position of the upper and lower forming rolls R1 and R2 to be varied with movement of the slide plate 111 along the opposite rails 107 on the base 103 as the forward/backward moving cylinder moves forward/backward.

The flexible roll forming device 100 may control an angle of the upper and lower forming rolls R1 and R2 from the process direction to be varied with turning of the turntable 121 with respect to the slide plate 111 as the turning motor 122 positioned in the space portion 105 of the base 103 mounted to the slide plate 111 through the turning reducer 123 turns.

The upper and lower forming rolls R1 and R2 bend the material fed thereto as the upper and the lower roll motors RM1 and RM2 rotate in opposite directions.

The flexible roll forming device 100 causes flexible roll forming of the material fed thereto as the positions in the lateral direction of the process and the angles from the process direction of the upper and lower forming rolls R1 and R2 are respectively varied with forward/backward movement of the slide plate 111 by the forward/backward moving cylinder 113 and turning of the turntable 121 by rotation of the turning motor 122, and at the same time, by rotation of the upper and lower forming rolls R1 and R2 in opposite directions by the rotation of the motors.

Referring to FIG. 7, an example of the steps of roll forming with the flexible roll forming device 100 will be described, with reference to the blank material B in FIG. 5 having a straight portion P1, an expanded portion P2, and a curved portion P3.

That is, referring to FIG. 7 (a), in flexible roll forming of flanges F at the straight portion P1 of the blank material B, the opposite upper and lower forming rolls R1 and R2 are disposed to have fixed positions in the lateral direction of the process, and to have angles at a right angle to the process direction at the straight portion P1 of the blank material B for bending fixed widths of the edges of the straight portion P1 downward to cause roll forming of the flanges F, respectively.

Then, referring to FIG. 7 (b), the opposite upper and lower forming rolls R1 and R2 proceed to the curved portion P3 of the blank material B while having the fixed positions in the lateral direction of the process as they were and only varying the angles from the process direction up to an angle θ the same as the expanded portion P2 by rotating the motors 122 to cause roll forming of the fixed widths of the edges of the curved portion P3 into the flanges F.

Thereafter, referring to FIG. 7 (c), the opposite upper and lower forming rolls R1 and R2 proceed to the expanded portion P2 of the blank material B, and maintain the angles in the process direction the same as the angle θ of the expanded portion P2 as they were, while moving the positions P in the lateral direction of the process outward according to the edges of the expanded portion P2 by driving the forward/backward moving cylinders 113, to cause roll forming of the fixed widths of the opposite edges of the expanded portion P2 into the flanges F, to form a beam having different widths along the length direction and the flanges F by flexible roll forming.

If the formed beam B having the rectangular flanges F on opposite sides formed by the flexible roll forming is subjected to general roll forming to form rectangular opposite sides with respect to a length direction center line S of the blank, a 3D shape of the formed product having a modified cross-section with different widths and heights along the length direction owing to the expanded portion may be flexibly roll formed.

With such formed products, vehicle body members, frames, and beams having cross-sectional profiles of which widths and heights are different from one another along the length direction can be roll formed as one unit with one roll forming event, permitting minimization of following steps, such as welding, jointing, and the like, and contributing to manufacture of lighter vehicles.

Figure 8:
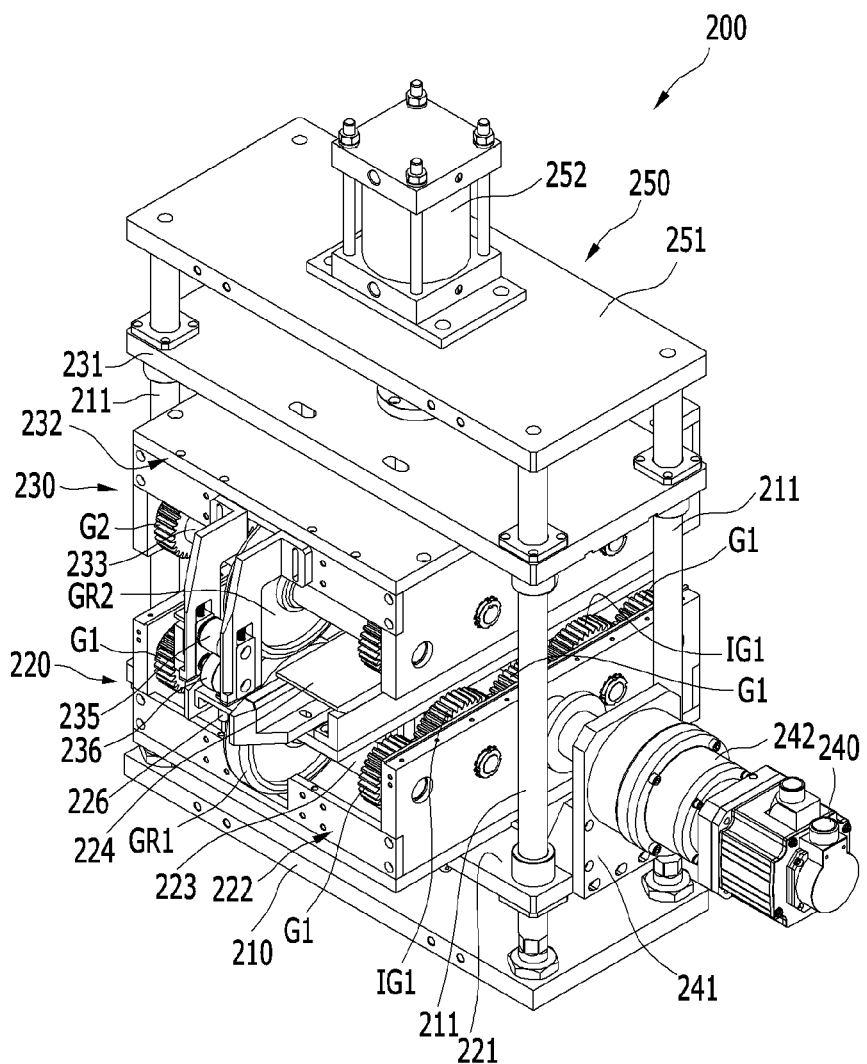
FIG. 8 illustrates a perspective view of a material guide device applicable to a flexible roll forming system in accordance with an exemplary embodiment of the present invention.
Figure 9:
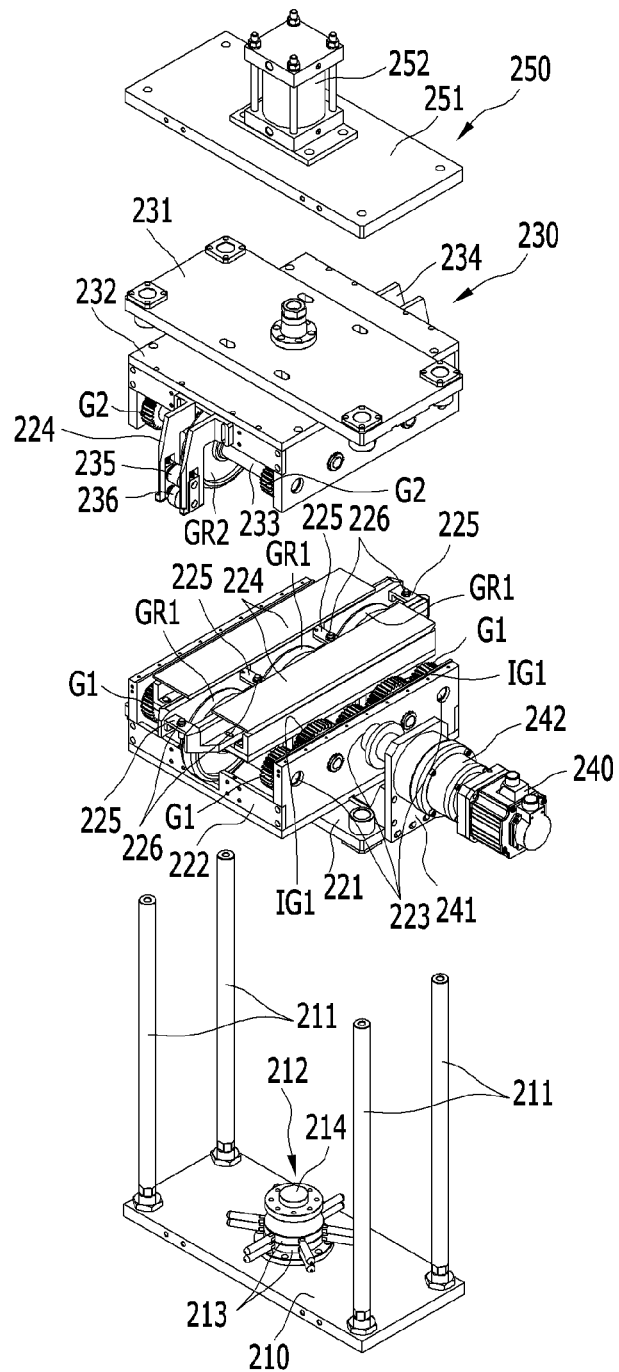
FIG. 9 illustrates an exploded perspective view of a material guide device applicable to a flexible roll forming system in accordance with an exemplary embodiment of the present invention, seen from above.
Figure 10:
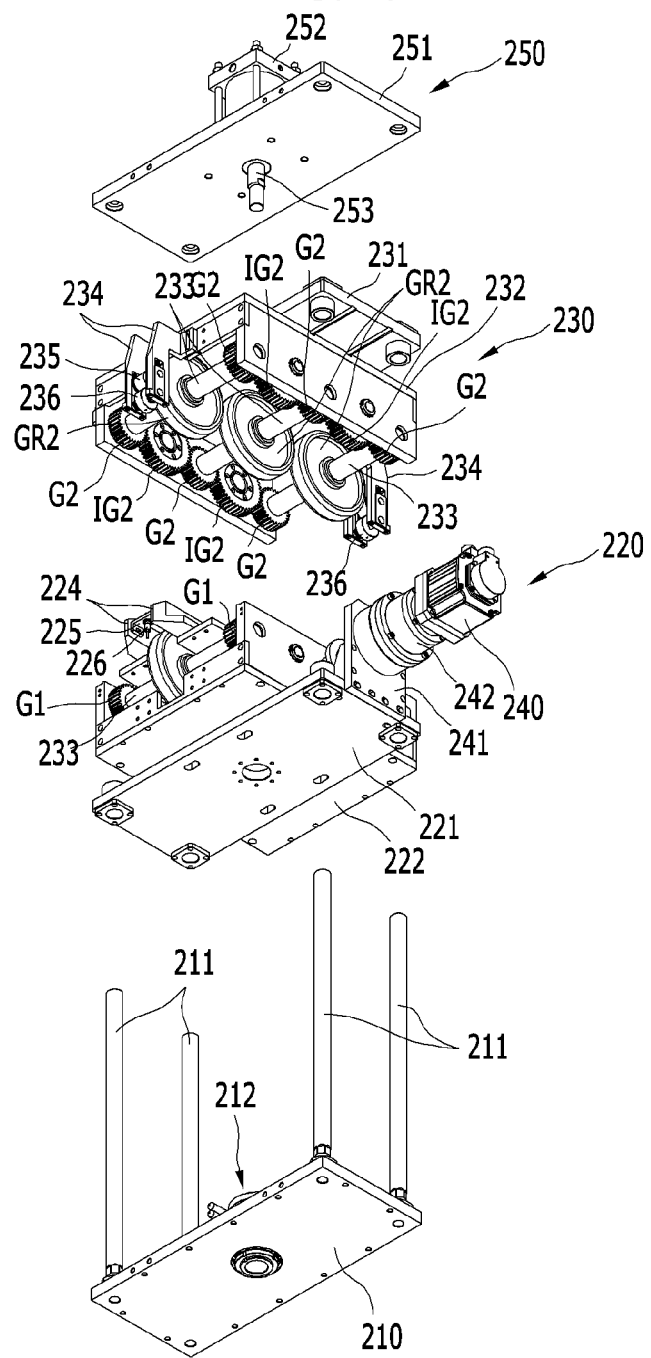
FIG. 10 illustrates an exploded perspective view of a material guide device applicable to a flexible roll forming system in accordance with an exemplary embodiment of the present invention, seen from below.

FIG. 8 illustrates a perspective view of a material guide device applicable to a flexible roll forming system in accordance with an exemplary embodiment of the present invention, FIG. 9 illustrates an exploded perspective view of a material guide device applicable to a flexible roll forming system in accordance with an exemplary embodiment of the present invention, seen from above, and FIG. 10 illustrates an exploded perspective view of a material guide device applicable to a flexible roll forming system in accordance with an exemplary embodiment of the present invention, seen from below.

Referring to FIGS. 8 to 10, the material guide device 200 in accordance with an exemplary embodiment of the present invention is provided between each of a plurality of the flexible roll forming devices 100 in the flexible roll forming system for guiding the blank material B (see FIG. 5) rather than the coil material.

The material guide device 200 includes a base plate 210, a lower roller unit 220, an upper roller unit 230, a drive motor 240, and a pressure applying means 250.

The base plate 210, which is a rectangular plate, has guide posts 211 mounted to corners thereof in a vertical direction, respectively.

The lower roller unit 220 includes a lower slide plate 221 coupled to the guide posts 211 to be movable in up/down directions, a lower roller housing 222 mounted on the lower slide plate 221, and a plurality of lower rollers GR1 mounted to the lower roller housing 222, and as an example, three lower rollers GR1.

The lower rollers GR1 are mounted to opposite side walls of the lower roller housing 222 with a plurality of lower roller shafts 223, and as an example, three lower roller shafts 223, which are rotatably mounted thereto in the process direction.

Each of the three lower roller shafts 223 has a drive gear G1 mounted thereto.

A lower idle gear IG1 engaged with the drive gears G1 is mounted between adjacent drive gears G1.

A guider 224 is disposed to the lower roller housing 222 between adjacent lower rollers GR1 for guiding the material.

A plurality of sensors, for example, four sensors 226, are mounted to the guider 224 with a plurality of sensor brackets 225 coupled thereto for sensing the material.

A height adjusting means 212 including a height adjusting nut 213 rotatably provided on the base plate 210 and a height adjusting shaft 214 fastened to the height adjusting nut 213 is provided on the base plate 210.

The height adjusting shaft 214 has a top side secured to an underside of the lower roller housing 222 for adjusting height of the lower roller housing 222 according to adjustment of the height adjusting nut 213 to set the height of the lower roller housing 222.

The upper roller unit 230 is mounted as the corners of an upper slide plate 231 are respectively inserted with the guide posts 211, and a plurality of upper rollers GR2, for example, three upper rollers GR2, are provided to an upper roller housing 232 mounted under the upper slide plate 231 matched to the lower rollers GR1 engaged with gears to one another along the process direction.

That is, the upper roller unit 230 includes the upper slide plate 231 mounted to the guide posts 211 to be movable in up/down directions matched to an upper side of the lower roller unit 220, the upper roller housing 232 mounted under the upper slide plate 231, a plurality of upper roller shafts 233, for example, three upper roller shafts 233, rotatably mounted to the upper roller housing 232 along the process direction, and three upper rollers GR2 rotatably mounted to the upper roller shafts 233, respectively.

The three roller housings 232 have three driven gears G2 mounted thereto with the three upper roller shafts 233, respectively.

An upper idle gear IG2 engaged with the driven gears G2 is rotatably mounted between adjacent driven gears G2.

An encoder 235 is mounted to the upper roller housing 232 with an encoder bracket 234 mounted to the upper roller housing 232 for measuring a feeding speed of the material in a rolling contact state with the material.

The drive motor 240 is mounted to one side of the lower slide plate 221 with a motor bracket 241 such that a rotation shaft of the drive motor 240 is connected to one of the lower roller shafts 223 through a reducer 242 for forwarding rotation force thereto.

That is, the drive motor 240 may be a servo motor of which RPM and rotation direction are controllable.

The pressure applying means 250 is provided to an upper side of an upper plate 251 fixedly secured to a top side of each of the guide posts 211 for applying pressure to the material passing through between the lower roller GR1 and the upper roller GR2 by drive of the cylinder.

That is, the pressure applying means 250 is fixedly mounted to the upper side of the upper plate 251 which is fixedly mounted to a top side of each of the guide posts 211 at respective corners.

A pressure applying cylinder 252 is fixedly secured to the upper plate 251 to face downward, and to have an operation rod 253 thereof connected to the upper side of the upper slide plate 231 passed through the upper plate 251 for transmission of the pressure from the pressure applying cylinder 252 thereto.

The operation of the material guide device 200 in the flexile roll forming system having a configuration described above will be described with reference to FIG. 11.

Figure 11:
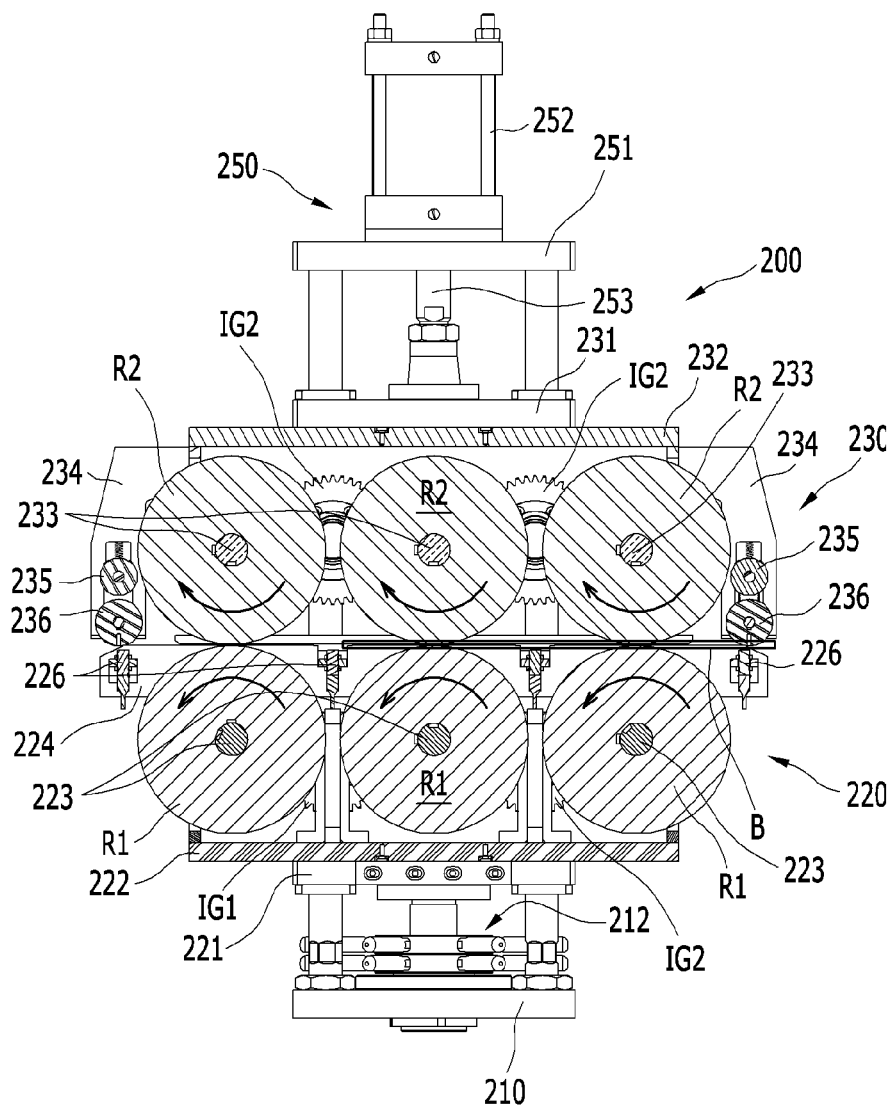
FIG. 11 illustrates a side sectional view of a material guide device applicable to a flexible roll forming system in accordance with an exemplary embodiment of the present invention, for describing an operation thereof.

FIG. 11 illustrates a side sectional view of a material guide device applicable to a flexible roll forming system in accordance with an exemplary embodiment of the present invention, for describing an operation thereof.

Referring to FIGS. 8 to 11, the material guide device 200 respectively rotates the three lower rollers GR1 in a clockwise direction as the drive motor 240 rotates if the blank material B is fed between a front encoder 235 and a front sensor 226 from the flexible roll forming device in a front direction of the process and sensed at the front sensor 226 while rotating an encoder roller 236.

In this state, if the blank material B is fed between the front upper roller GR2 and the front lower roller GR1, the blank material B moves in a rear direction of the process while rotating the front upper roller GR2 by using a torque of the front lower roller GR1 rotated in a rolling contact state with the front upper roller GR2 and the front lower roller GR1.

That is, the blank material B passes between the upper rollers GR2 and the lower rollers GR1 respectively positioned at middle and rear positions of the three upper and lower rollers owing to torque of the middle and rear lower rollers GR1 while being guided by the guider 224.

The blank material B having passed through the rear upper roller GR2 and the rear lower roller GR1 thus is fed to the flexible roll forming device 100 passing through the encoder 235 and the sensor 226.

In this case, the blank material B is sensed at four of the sensors 226 between each of the lower rollers GR1 as the blank material B passes through between the middle and rear upper rollers GR2 and lower rollers GR1, and rotates a rear encoder roller 236 as the blank material B passes through the rear encoder 235.

That is, each of the front and rear encoders 235 detects a moving speed of the blank material B owing to RPM of each of the encoder rollers 236, and forwards a signal thereof to a controller (not shown), and the sensors 226 between, and front and rear of, the lower rollers GR1 sense presence of the blank material B and forward a signal thereof to the controller (not shown) as well.

If there is no signal on detection of the blank material B from the four sensors 226, and no RPM signal from the front and rear encoders 235, the controller (not shown) controls to temporarily stop the drive motor 240.

Eventually, the material guide device 200 each provided between adjacent flexible roll forming devices 100 can allow regular feeding of the material to each stage of the flexible roll forming devices 100 by guiding the blank material B through the three lower and upper rollers GR1 and GR2.

Figure 12:
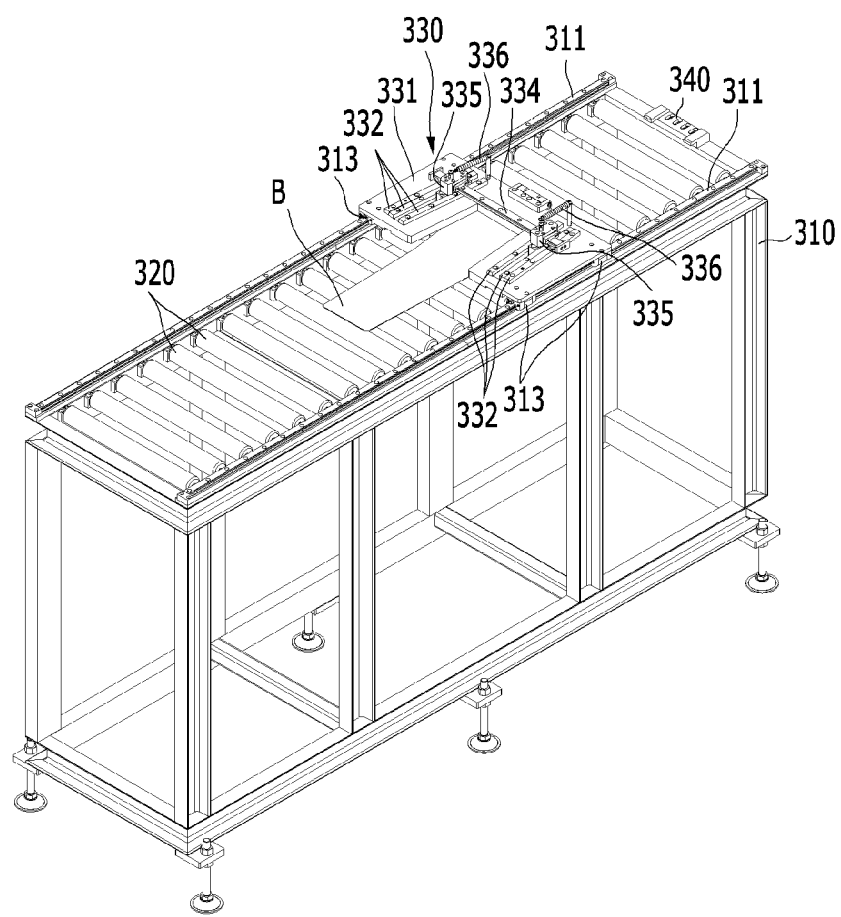
FIG. 12 illustrates a perspective view of a material feeding device applicable to a flexible roll forming system in accordance with an exemplary embodiment of the present invention.
Figure 13:
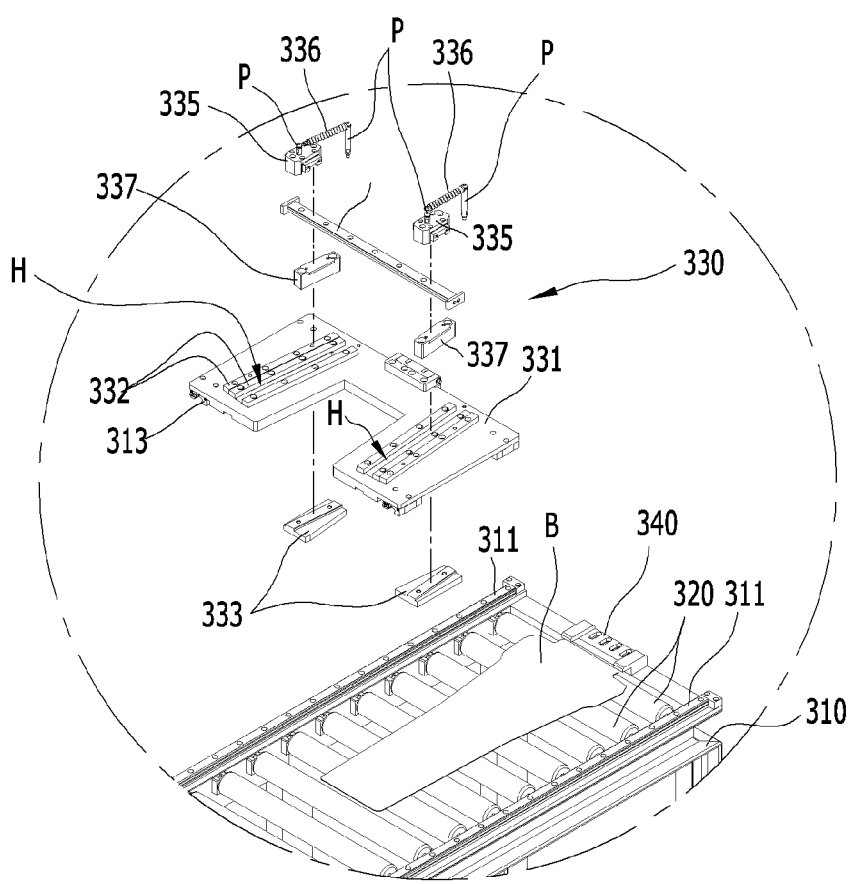
FIG. 13 illustrates an exploded perspective view of a material feeding device applicable to a flexible roll forming system in accordance with an exemplary embodiment of the present invention.

FIG. 12 illustrates a perspective view and FIG. 13 illustrates an exploded perspective view of a material feeding device applicable to a flexible roll forming system in accordance with an exemplary embodiment of the present invention.

Referring to FIGS. 12 and 13, a material feeding device 300 in accordance with an exemplary embodiment of the present invention includes a conveyor frame 310, a plurality of conveyor rollers 320, a centering slider unit 330, and an entrance stopper 340.

The conveyor frame 310 is provided in front of the material guide device 200 in front of the first stage flexible roll forming device 100 with respect to the process direction.

The conveyor frame 310 has the plurality of the conveyor rollers 320 rotatably mounted to an upper side thereof, and guide rails 311 mounted along sides thereof.

The centering slider unit 330 includes a sliding plate 331, centering rails 332, a lateral direction rail 334, lateral direction sliders 335, centering sliders 333, and restoring springs 336.

The sliding plate 331 is mounted to the guide rails 311 with slide blocks 313 to be slidably movable in the process direction.

The sliding plate 331 has sliding hollows H formed therein on opposite sides with respect to the process direction in a slanted position. Each sliding hollow H is formed to have a distance to an opposite sliding hollow H which becomes larger as the hollow H goes farther in the process direction, with a largest distance thereof formed larger than a largest width of the blank material B by a predetermined value.

The centering rails 332 are mounted on the sliding plate 331 on inner and outer sides of opposite sliding hollows H, respectively.

The lateral direction rail 334 is disposed on an upper side of a front side of the sliding plate 331 in the lateral direction, and the lateral direction sliders 335 are disposed on opposite sides of the lateral direction rail 334 for slidably moving along the lateral direction rail 334.

The centering sliders 333 are respectively disposed on an underside of opposite hollows H in the sliding plate 331 connected to the lateral direction sliders 335 through the opposite sliding hollows H, respectively.

The centering sliders 333 are connected to the lateral direction sliders 335 with connection blocks 337 that are movably disposed in the opposite sliding hollows H, respectively.

The restoring springs 336 are connected to spring pins P on one side of the sliding plate 331, and to spring pins P at the lateral direction sliders 335 for providing restoring elastic force to the centering sliders 333, respectively.

The entrance stopper 340 is configured in a shape of a block at the front of the conveyor frame 310 for limiting slide movement of the sliding plate 331.

Eventually, the material feeding device 300 described above sets the blank to a home position in front of the frontmost first stage flexible roll forming device 100 to feed the blank to the material guide device 200.

The operation of the material feeding device 300 in the flexible roll forming system will be described with reference to FIGS. 14 to 16.

Figure 14:
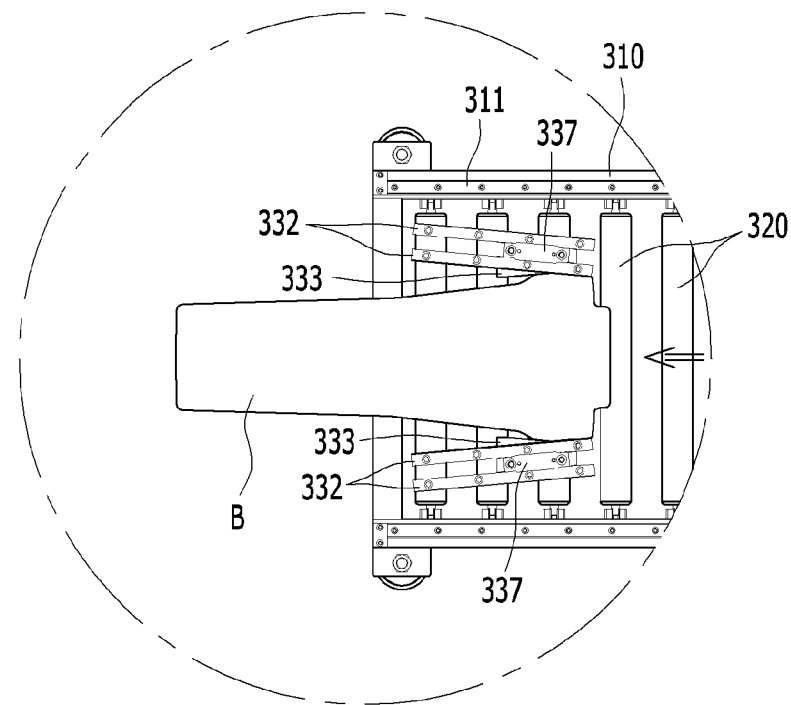
FIGS. 14 to 16 each illustrate a state of an operation step of a material feeding device applicable to a flexible roll forming system in accordance with an exemplary embodiment of the present invention.
Figure 15:
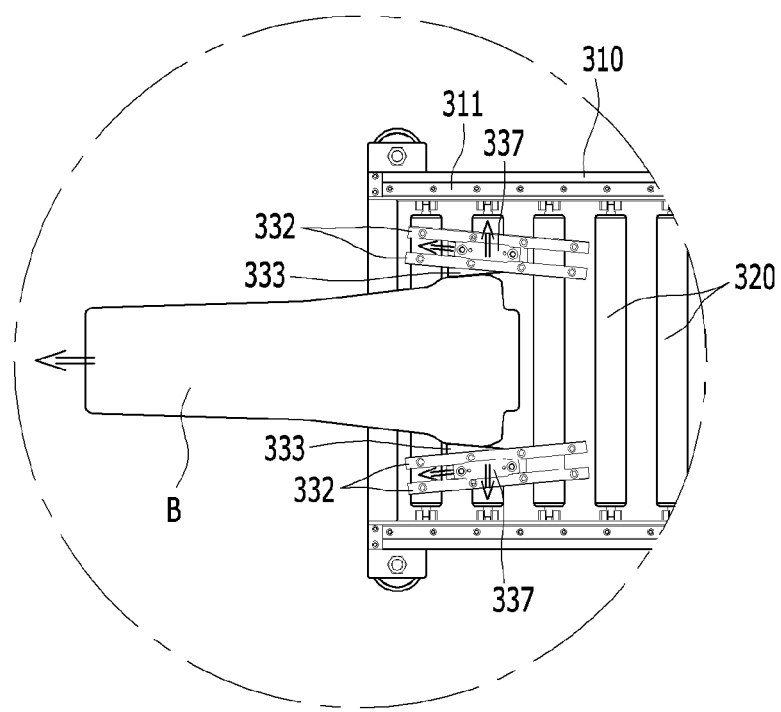
Figure 16:
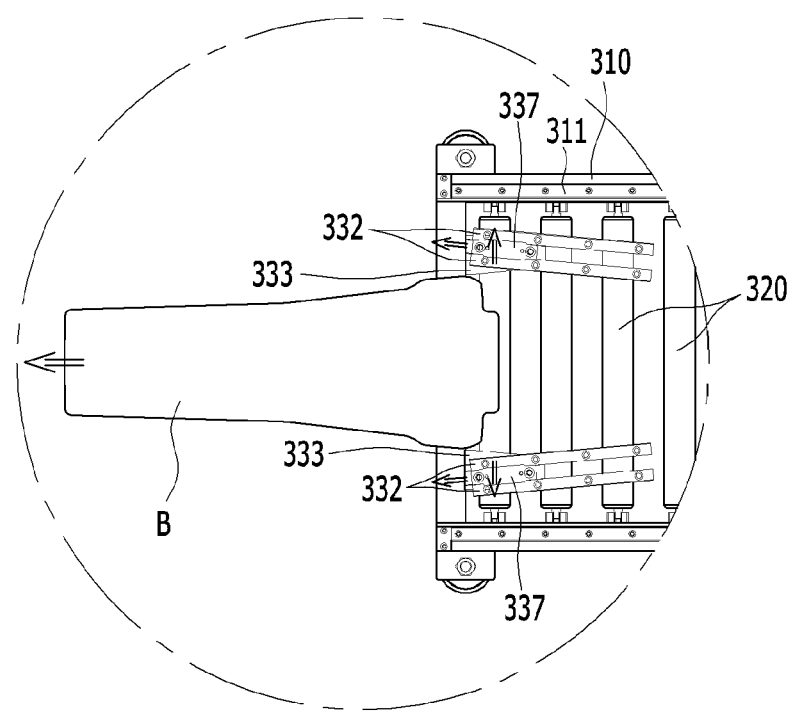

FIGS. 14 to 16 each illustrate a state showing an operation step of a material feeding device applicable to a flexible roll forming system in accordance with an exemplary embodiment of the present invention.

Referring to FIGS. 12 to 16, the material feeding device 300 is configured in front of the frontmost flexible roll forming device 100 for setting and feeding the blank material B in the home position.

That is, referring to FIG. 14, in a state that the blank material B at tips of opposite sides at a largest width position thereof is inserted and held between the opposite centering sliders 333 on the conveyor rollers 320, the sliding plate 331 is pushed in the process direction to position the blank material B at an entrance to the frontmost flexible roll forming device 100.

Then, referring to FIG. 15, the blank material B at a fore end thereof is drawn in by the upper and lower forming rolls R1 and R2 of the front most flexible roll forming device and is moved forward together with the opposite centering sliders 333.

Since the opposite centering sliders 333 move along the opposite centering rails 332 together with the blank material B in a state that the opposite centering sliders 333 hold the tips of the opposite sides of the blank material B, a distance between the opposite centering sliders 333 becomes large.

In this case, the opposite lateral direction sliders 335 move outward respectively in the lateral direction at the same time along the lateral direction rail 334 together with movement of the opposite centering sliders 333 in the process direction, maintaining predetermined travel of the opposite centering sliders 333, respectively.

Eventually, referring to FIG. 16, while the opposite centering sliders 333 move together with the blank material B in the process direction, the blank material B is fed to the upper and lower forming rolls R1 and R2 of the frontmost flexible roll forming device at a moment a distance between the opposite centering sliders 333 becomes larger than the largest width of the blank material B, thereby causing the flexible roll forming.

In this case, the opposite centering sliders 333 having the blank material B come out therefrom move to the front of the process direction again by the restoring elastic force of the restoring springs, respectively, and an operator moves the centering slider 333 unit to the front of the process for a next operation.

The flexible roll forming system in accordance with an exemplary embodiment of the present invention can cause roll forming of a 3D formed beam having a modified cross-section with different widths and heights along a length direction of the blank by using the blank material B having the straight portion, the expanded portion, and so on with the multi-stage flexible roll forming device 100 for varying axis direction positions and angles of the upper and lower forming rolls R1 and R2, the material guide device 200 for regular transfer of the material, and the material feeding device 300 for feeding the material to the home position.

Eventually, vehicle body members, frames, and beams having cross-section profiles of which widths and heights are different from one another along the length direction can be roll formed as one unit with one roll forming event, permitting minimization of following steps, such as welding, jointing, and the like, and also contributing to manufacture of lighter vehicles.

Thus, although one exemplary embodiment of the present invention is described, the present invention is not limited to the exemplary embodiment, but includes all range of changes made by a person skilled in this field of art from the exemplary embodiment of the present invention and recognized equivalents to the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flexible roll forming device comprising:
   bases symmetrically disposed on both sides of a process direction and facing each other, each having front and back walls perpendicular to the process direction, lateral walls parallel to the process direction connected to the front and back walls, a space portion surrounded by the walls, the space portion having an opening toward an upper side, and rails disposed on opposite sides of the opening and extended laterally to the roll forming process direction;
   forward/backward moving means having a slide plate configured to be movable along the rails on the base;
   turning means rotatably provided to the slide plate; and roll forming means provided on the turning means to include upper and lower forming rolls for subjecting a material fed thereto to flexible roll forming by using the upper and lower forming rolls while varying positions in the lateral direction of processing with the forward/backward moving means, and angles from a process direction with the turning means, wherein upper and lower forming rolls are respectively coupled to roll shafts while being secured with keys, and blanking plates are respectively fastened to fore ends of the roll shafts and fitted within the upper and lower forming rolls for preventing the upper and lower forming rolls from falling off the roll shafts, wherein the turning means includes a turning reducer mounted to a center of the slide plate, a turning motor mounted under the turning reducer and the slide plate for supplying a torque, and a turntable mounted over the turning reducer so as to be turned by the torque from the turning motor, and wherein only the turning motor is disposed in the space portion of the base through the opening in the base.

2. The flexible roll forming device of claim 1, wherein the forward/backward moving means further includes a forward/backward moving cylinder mounted on the base connected to the slide plate with an operation rod.

3. The flexible roll forming device of claim 1, further comprising a plurality of sensors mounted on the slide plate, for sensing a sensing dog mounted on one side of an underside of the turntable to sense a home position of the turntable with respect to the slide plate, and states of rotation limit positions of the turntable in one direction and another direction and forwarding a signal corresponding to the state of rotation limit position to a controller.

4. The flexible roll forming device of claim 1, wherein the roll forming means includes:

upper and lower plates;

roll posts coupled to the upper and lower plates mounted to the turning means;

upper and lower roll housings mounted to the roll posts to be movable in up/down directions; and upper and lower roll motors mounted to outsides of the upper and lower roll housings connected to the upper and lower forming rolls passed through the roll housings, respectively.

5. The flexible roll forming device of claim 4, further comprising adjusting bolts provided between the upper and lower plates and the upper and lower housings for adjusting and securing positions of the upper and lower roll housings, respectively.

6. A flexible roll forming system comprising:

a plurality of flexible roll forming devices, each flexible roll forming device including bases symmetrically disposed on both sides of a process direction and facing each other, each having an opening formed in an upper side thereof connected to an inside thereof, and rails disposed thereon on opposite sides of the opening laterally to the process direction, forward/backward moving means having a slide plate configured to be movable along the rails on the base, turning means rotatably provided to the slide plate, and roll forming means provided on the turning means to include upper and lower forming rolls for subjecting a material fed thereto to flexible roll forming by using the upper and lower forming rolls while varying positions in the lateral direction of processing with the forward/backward moving means, and angles from a process direction with the turning means, wherein upper and lower forming rolls are respectively coupled to roll shafts while being secured with keys, and blanking plates are respectively fastened to fore ends of the roll shafts for preventing the upper and lower forming rolls from falling off the roll shafts;

a plurality of material guide devices, each material guide device including a base plate having a plurality of guide posts mounted thereto, a lower roller unit including a lower slide plate coupled to the guide posts to be movable in up/down directions, a lower roller housing mounted to the lower slide plate, and a plurality of lower rollers mounted to the lower roller housing, an upper roller unit including an upper slide plate mounted to respective guide posts, an upper roller housing mounted under the upper slide plate, and a plurality of upper rollers mounted to the upper roller housing, a drive motor mounted to one side of the lower slide plate such that a rotation shaft of the drive motor is connected to one of lower roller shafts of one of the plurality of lower rollers for forwarding rotation force thereto, and pressure applying means provided on the upper plate for applying a pressure to a material passing through respective lower rollers and upper rollers; and a material feeding device including a conveyor frame having a plurality of conveyor rollers and guide rails mounted along opposite sides thereof respectively, and a centering slider unit including a sliding plate to be slidably movable in the process direction along the guide rails, centering rails mounted on the sliding plate in slanted positions, respectively, and centering sliders provided to be movable along the centering rails for holding opposite tips of sides of a blank material fed thereto, wherein each flexible roll forming device is provided between the plurality of material guide devices and the material feeding device is provided in front of a first material guide device with respect to the process direction.

* * * * *